United States Patent
Klicpera et al.

(10) Patent No.: US 12,355,283 B2
(45) Date of Patent: *Jul. 8, 2025

(54) METHODS AND APPARATUS TO PROVIDE INDICATIONS OF SHUTDOWN STATES DEVICES

(71) Applicant: ZEBRA TECHNOLOGIES CORPORATION, Lincolnshire, IL (US)

(72) Inventors: Christopher P. Klicpera, Westbury, NY (US); Edward Barkan, Miller Place, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,272

(22) Filed: Feb. 19, 2024

(65) Prior Publication Data

US 2024/0195194 A1 Jun. 13, 2024

Related U.S. Application Data

(63) Continuation of application No. 17/670,823, filed on Feb. 14, 2022, now Pat. No. 11,909,235.

(51) Int. Cl.
*H02J 7/00* (2006.01)
*G06K 7/10* (2006.01)
*G06K 7/14* (2006.01)

(52) U.S. Cl.
CPC ...... *H02J 7/00306* (2020.01); *G06K 7/10881* (2013.01); *G06K 7/1413* (2013.01); *H02J 7/0048* (2020.01)

(58) Field of Classification Search
CPC . G06K 7/10881; G06K 7/1413; H02J 7/0048; H02J 7/00306
USPC ..................................... 235/462.45
See application file for complete search history.

(56) References Cited

U.S. PATENT DOCUMENTS

| | | | |
|---|---|---|---|
| 6,177,683 B1 * | 1/2001 | Kolesar ............. | G06K 7/10722 235/491 |
| 10,025,966 B1 * | 7/2018 | Volta .................... | H02J 7/0044 |
| 10,496,858 B2 * | 12/2019 | Volta .................... | H02J 7/0044 |
| 2001/0042396 A1 * | 11/2001 | DiMora ................ | B65H 7/00 73/1.79 |
| 2003/0121981 A1 * | 7/2003 | Slutsky ............. | G06K 7/10851 235/462.45 |

(Continued)

*Primary Examiner* — Paultep Savusdiphol
(74) *Attorney, Agent, or Firm* — Yuri Astvatsaturov

(57) ABSTRACT

Methods and apparatus for providing indications of shutdown states for handheld devices are disclosed herein. An example handheld device includes a power source, a power source monitor, an indicator, and a processor disposed inside a housing. The power source monitor is configured to detect whether the power source has reached a pre-determined amount of discharge at which the internal power source is to be shut down to prevent damage. The processor configured to, when the internal power source has reached the pre-determined amount of discharge: configure the indicator to provide, while the internal power source is in the shutdown state, an indication that the internal power source is shutdown, and configure the internal power source into the shutdown state such that the processor is de-energized.

27 Claims, 6 Drawing Sheets

(56) References Cited

U.S. PATENT DOCUMENTS

| | | | | |
|---|---|---|---|---|
| 2007/0145147 A1* | 6/2007 | Schmidt | ............... | G06K 7/14 |
| | | | | 235/462.46 |
| 2009/0102671 A1* | 4/2009 | Susewitt | ............ | G01R 31/3648 |
| | | | | 235/472.01 |
| 2013/0201026 A1* | 8/2013 | Grosberg | ......... | H01M 10/4257 |
| | | | | 340/636.1 |
| 2013/0262002 A1* | 10/2013 | Braun | ............... | H02J 7/0013 |
| | | | | 702/63 |
| 2014/0191033 A1* | 7/2014 | Wojcik | ............... | G06F 1/1628 |
| | | | | 235/449 |
| 2018/0293412 A1* | 10/2018 | Volta | ............... | H02J 7/0044 |

* cited by examiner

METHODS AND APPARATUS TO PROVIDE INDICATIONS OF SHUTDOWN STATES DEVICES

CROSS-REFERENCE TO RELATED APPLICATIONS

The current application is a continuation of U.S. patent application Ser. No. 17/670,823, filed on Feb. 14, 2022, and incorporated herein by reference in its entirety.

BACKGROUND

Some handheld barcode scanners are powered by lithium ion supercapacitor batteries. Lithium ion supercapacitor batteries have some advantages over other types of power sources. However, lithium ion supercapacitor batteries must be completely shut down, without the option to wake back up, before the supercapacitor becomes fully discharged to prevent damage to the battery due to over discharge.

SUMMARY

In an embodiment, the present invention is a handheld scanner including: a housing having an opening; an internal power source disposed inside the housing, and having an active state in which output power is provided, and a shutdown state in which no output power is provided; a power source monitor configured to detect whether the internal power source has reached a pre-determined amount of discharge at which the internal power source is to be shut down to prevent damage to the internal power source; an image sensor directed toward the opening, and configured to (i) be energized by the internal power source when the internal power source is in the active state, and (ii) capture image data representing an environment in a field of view of the handheld scanner; a barcode decoder in communication with the image sensor, and configured to (i) be energized by the internal power source when the internal power source is in the active state, (ii) receive the image data, and (iii) decode a barcode captured in the image data; an indicator; and a processor. The processor is configured to be energized by the internal power source when the internal power source is in the active state; and detect, based upon one or more outputs of the power source monitor, whether the internal power source has reached the pre-determined amount of discharge. When the internal power source has reached the pre-determined amount of discharge, the processor is configured to configure the indicator to provide, while the internal power source is in the shutdown state, an indication that the internal power source is shutdown, and configure the internal power source into the shutdown state such that the image sensor, the indicia decoder, and the processor are de-energized.

In a variation of this embodiment, when the internal power source is charged to above the pre-determined amount of discharge, the processor is re-energized, configures the internal power source to the active state, and configures the indicator to indicate that the internal power source is in the active state.

In a variation of this embodiment, the indicator includes an E ink display, and the processor is configured to control the E ink display to display one or more non-volatile indications representative of the internal power source being in the shutdown state, and the E ink display continues displaying the one or more indications while the internal power source is in the shutdown state.

In a variation of this embodiment, a first indication of the one or more indications depicts a discharged battery.

In a variation of this embodiment, the indicator includes a mechanical indicator, and the processor is configured to control the mechanical indicator from a first position to a second position to indicate that the internal power source is in the shutdown state.

In a variation of this embodiment, the mechanical indicator includes a selectively positionable sliding member.

In a variation of this embodiment, a portion of the mechanical indicator is exposed through a second opening in the housing, wherein the mechanical indicator in the first position exposes a first portion of the mechanical indicator having a first color through the second opening, and the mechanical indicator in the second position exposes a second portion of the mechanical indicator having a second different color through the second opening.

In a variation of this embodiment, the internal power source is a primary internal power source, and the handheld scanner further comprises a secondary internal power source, wherein the indicator includes a shutdown state indicator circuit powered or energized by the secondary internal power source, and wherein the processor configures the indicator by activating the shutdown state indicator circuit.

In a variation of this embodiment, the secondary internal power source is not configured to power the image sensor, the barcode decoder, and the processor.

In a variation of this embodiment, the shutdown state indicator circuit includes: an input component configured to sense an attempted use of the handheld scanner; and an output component configured to provide the indication, wherein the input component and the output component are energized by the secondary internal power source.

In a variation of this embodiment, the input component is configured to sense an activation of a trigger of the handheld scanner, and the output component includes a light emitting component that is blinked to provide the indication.

In a variation of this embodiment, the shutdown state indicator circuit further includes the processor, wherein the processor is energized by the secondary internal power source in response to the attempted use of the handheld scanner, and controls the output component to provide the indication, and shuts down.

In a variation of this embodiment, the handheld scanner further comprises a charging circuit configured to charge the secondary internal power source based on the power received from an external power source.

In a variation of this embodiment, the handheld scanner further comprises a charging circuit to: receive power from an external power source; charge the internal power source based on the power received from the external power source; detect whether the internal power source is charged above the pre-determined amount of discharge; and, when the internal power source is charged above the pre-determined amount of discharge, configure the internal power source into the active state to re-energize the image sensor, the indicia decoder, and the processor.

In a variation of this embodiment, the processor is configured to, responsive to the internal power source being configured into the active state, configure the indicator to indicate that the internal power source is in the active state.

In a variation of this embodiment, the processor is configured to, while the internal power source is being charged, configure the indicator to indicate that the internal power source is being charged.

In a variation of this embodiment, the processor is configured to, when the internal power source is fully charged, configure the indicator to indicate that the internal power source is fully charged.

In another embodiment, the present invention is a method comprising: detecting whether an internal power source of a handheld scanner has reached a pre-determined amount of charge at which the internal power source is to be shut down to prevent damage to the internal power source, the internal power source having an active state in which output power is provided to components of the handheld scanner, and a shutdown state in which no output power is provided; and, when the internal power source has reached the pre-determined amount of charge: configuring an indicator of the handheld scanner to indicate that the internal power source is in the shutdown state, wherein the indicator can indicate the shutdown state while the internal power source is in the shutdown state, and configuring the internal power source into the shutdown state such that the components of the handheld scanner are de-energized.

In a variation of this embodiment, configuring the indicator includes configuring an E ink display to display one or more indications representative of the internal power source being in the shutdown state, wherein the E ink display continues displaying the one or more indications while the internal power source is in the shutdown state.

In a variation of this embodiment, configuring the indicator includes controlling a mechanical indicator from a first position to a second position to indicate that the internal power source is in the shutdown state.

In a variation of this embodiment, the internal power source is a primary internal power source, and configuring the indicator includes configuring a shutdown state indicator circuit powered or energized by a secondary internal power source to provide the indication.

In a variation of this embodiment, configuring the shutdown state indicator circuit includes activating the shutdown state indicator circuit to respond to an attempted use of the handheld scanner, and to provide the indication via an output component, wherein the input component and the output component are energized by the secondary internal power source.

In a variation of this embodiment, the attempted use is an activation of a trigger of the handheld scanner, and the output component is a light emitting component that is blinked to provide the indication.

In yet another embodiment, the present invention is a non-transitory, computer-readable storage medium storing instructions that, when executed by one or more processors, cause a handheld scanner to: detect whether an internal power source of a handheld scanner has reached a pre-determined amount of charge at which the internal power source is to be shut down to prevent damage to the internal power source, the internal power source having an active state in which output power is provided to components of the handheld scanner, and a shutdown state in which no output power is provided; and, when the internal power source has reached the pre-determined amount of charge: configure an indicator of the handheld scanner to indicate that the internal power source is in the shutdown state, wherein the indicator can indicate the shutdown state while the internal power source is in the shutdown state, and configure the internal power source into the shutdown state such that the components of the handheld scanner are de-energized.

In a variation of this embodiment, the instructions, when executed by one or more processors, cause the handheld scanner to configure the indicator by configuring an E ink display to display one or more indications representative of the internal power source being in the shutdown state, and wherein the E ink display continues displaying the one or more indications while the internal power source is in the shutdown state.

In a variation of this embodiment, the instructions, when executed by one or more processors, cause the handheld scanner to configure the indicator by controlling a mechanical indicator from a first position to a second position to indicate that the internal power source is in the shutdown state.

In a variation of this embodiment, the internal power source is a primary internal power source, and the instructions, when executed by one or more processors, cause the handheld scanner to configure the indicator by activating a shutdown state indicator circuit that is powered or energized by a secondary internal power source, and provides the indication responsive to an attempted use the handheld scanner.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
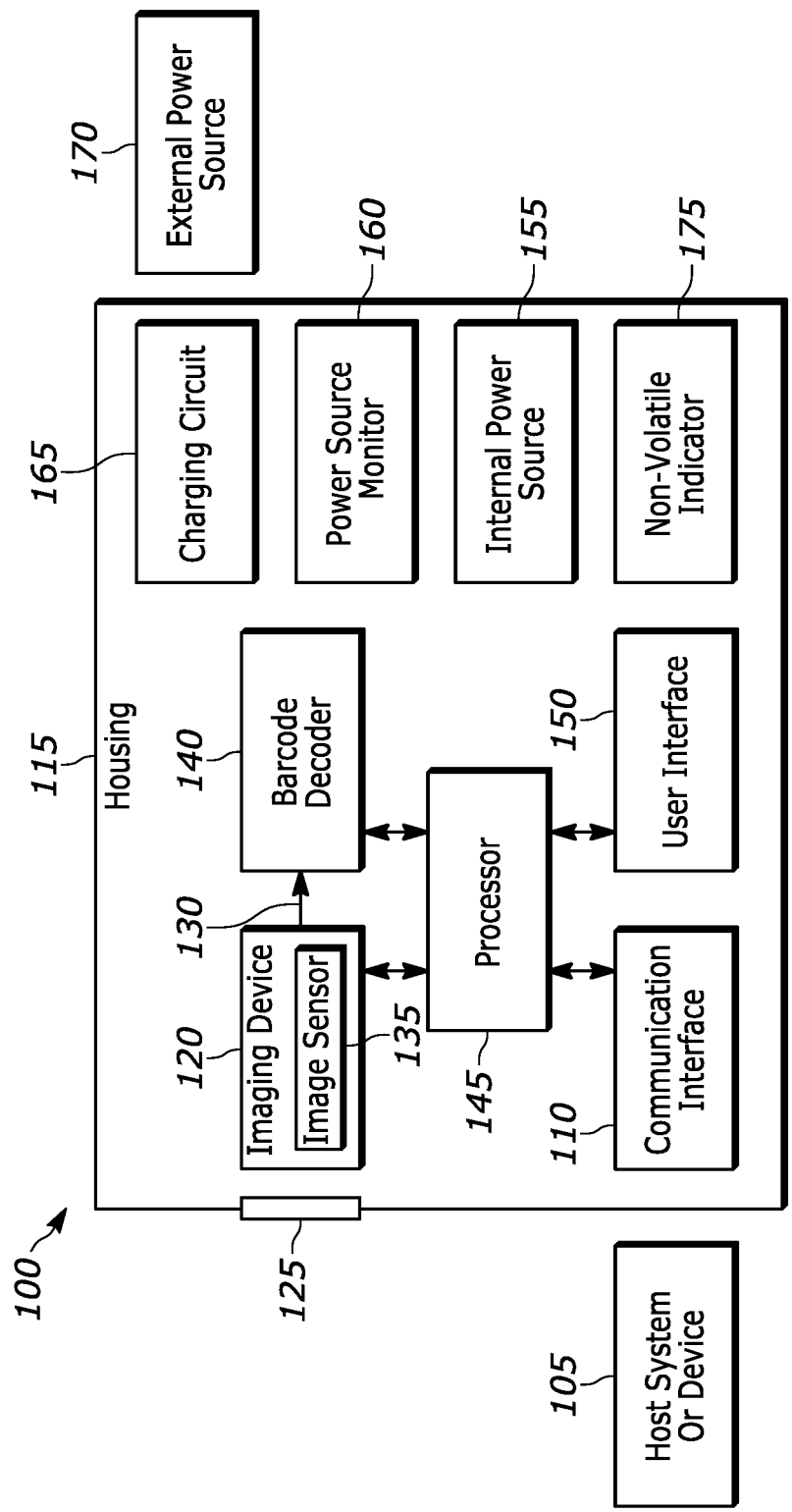
FIG. 1 is a block diagram of an example handheld scanner configured to provide indications of shutdown states, in accordance with embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

When a handheld scanner powered by, for example, a lithium ion supercapacitor battery completely and intentionally shuts down, without the option to wake back up, to prevent damage to the battery, the handheld scanner may appear dead, broken, or malfunctioning to a user. Unlike other types of batteries where it may be acceptable to wake up the handheld scanner upon, for example, a trigger pull to display a low battery indication, a lithium ion supercapacitor battery must remain in shutdown or lockout to prevent damage to the battery from over discharge. Users may mistake the intentional lockout or shutdown state for a dead, broken, or malfunctioning handheld scanner, which can cause user dissatisfaction and/or may trigger unnecessary service requests. Accordingly, there is a need for methods and apparatus for providing non-volatile indications of shutdown states for handheld scanners powered by such batteries. Disclosed embodiments provide shutdown indications without requiring power from the primary internal power source of a handheld scanner to operate. Accordingly, more of the charge of the internal power source can be used to power normal operations of the handheld scanner because it is not necessary to reserve power for providing shutdown indications.

Reference will now be made in detail to non-limiting examples, some of which are illustrated in the accompanying drawings.

Figure 3:
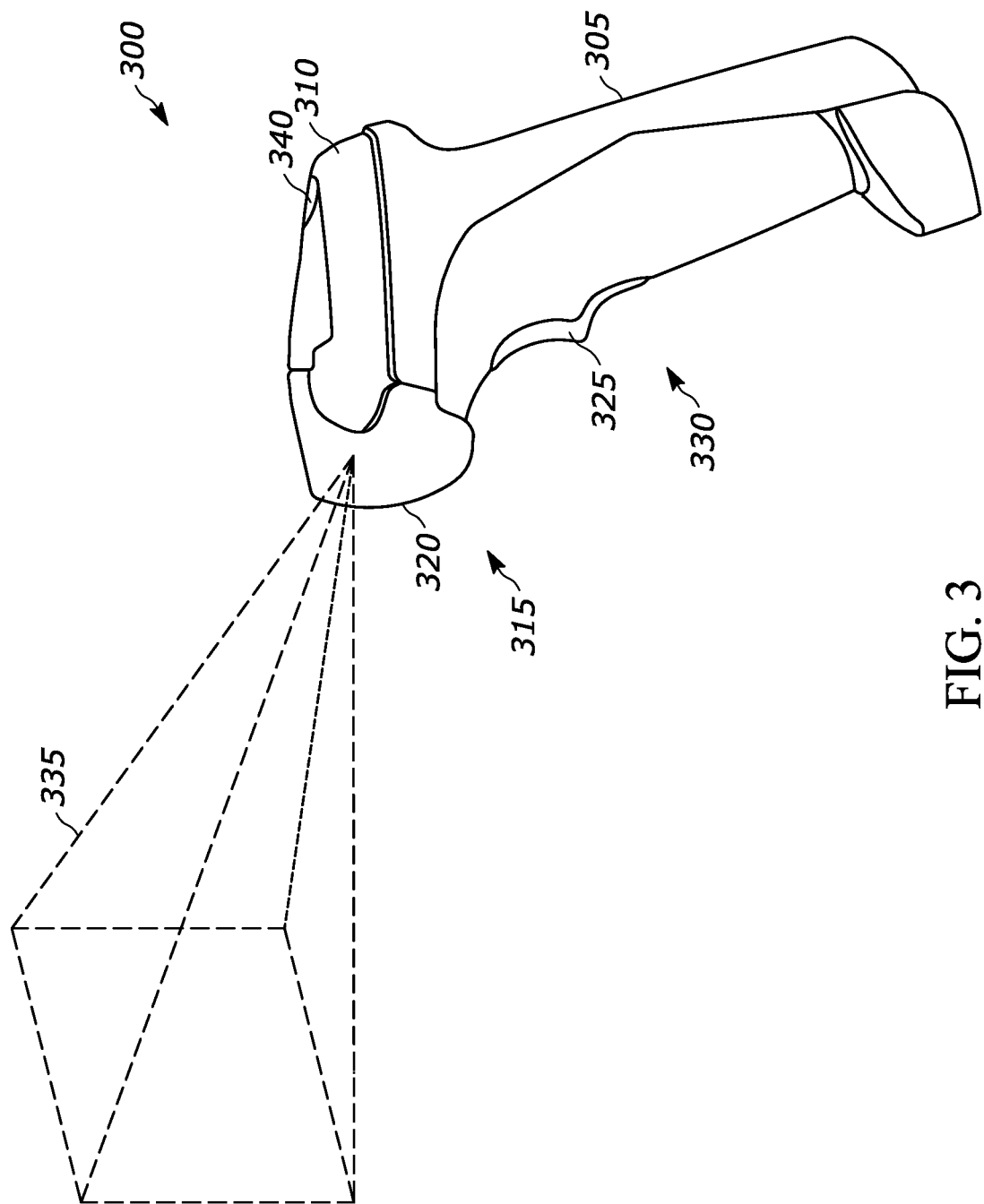
FIG. 3 is a perspective view of an example housing for a handheld scanner, in accordance with embodiments of the disclosure.

FIG. 1 is a block diagram of an example handheld scanner 100 configured to scan and, in some embodiments, decode scanned barcodes. The handheld scanner 100 can be, for example, a handheld barcode scanner or a handheld slot scanner that can operate in a handheld and/or a handsfree mode. The handheld scanner 100 can decode scanned barcodes, and provide the payload of decoded barcodes to a host computing device or system 105 via a communication interface 110. Additionally and/or alternatively, the handheld scanner 100 can provide scanned barcodes to a host computing device or system 105 via the communication interface 110 for decoding. Example host computing devices or systems 105 include a point-of-sale (POS) station, a point-of-transaction station, and an inventory management system. Example barcodes include one-dimensional (1D) barcodes, and two-dimensional (2D) barcodes. While embodiments of the disclosure are described with reference to barcodes, embodiments disclosed herein can be implemented by other handheld scanners that scan and, in some embodiments, decode other types of indicia, such as direct product markings (DPMs). An example logic circuit 600 that can be used to implement the handheld scanner 100 is discussed below in connection with FIG. 6. Components of the handheld scanner 100 are disposed, partially or fully, within a housing 115, an example of which is shown in FIG. 3 and described below.

The example handheld scanner 100 includes any number and/or type(s) of imaging devices 120 directed towards an opening 125 of the housing 115, and configured to capture images 130. The imaging device(s) 120 capture, using an image sensor 135 having a plurality of photosensitive elements, image data representing an image 130 of an environment in which the handheld scanner 100 is operating that falls within a field of view (FOV) of the imaging device 120. Example image data includes data representing the outputs of the plurality of photosensitive elements, that is, the pixels of the image sensor 135.

The example handheld scanner 100 can include any number and/or type(s) of barcode decoders 140 configured to locate and decode barcodes from image data representing one or more images 130 to determine the payload of the barcodes. However, the barcode decoder(s) 140 can, additionally and/or alternatively, be implemented by a host computing device or system 105 that decodes barcodes from image data captured by the imaging device(s) 120 and received from the handheld scanner 100 via the communication interface 110. Example barcode decoders 140 include a programmable processor, programmable controller, graphics processing unit (GPU), digital signal processor (DSP), etc. capable of executing instructions to, for example, implement operations of the example methods described herein. Additionally and/or alternatively, the barcode decoder 140 can include one or more logic circuits capable of, for example, implementing operations of the example methods described herein without executing software or instructions.

The example handheld scanner 100 includes one or more example processor(s) 145 to generally control the handheld scanner 100. For example, the processor 145 can control the imaging device(s) 120 to capture images 130; control the barcode decoder(s) 140 to locate and decode barcodes in captured images 130; provide payloads of decoded barcodes to a host computing device or system 105 via the communication interface 110; provide image data to a host computing device or system 105 via the communication interface 110 for decoding; execute an operating system; provide one or more user interfaces 150; respond to user inputs received via the communication interface 110 and/or the user interface 150; execute one or more applications on behalf of a user; etc. Example processor(s) 145 include a programmable processor, programmable controller, GPU, DSP, etc. capable of executing instructions to, for example, implement operations of the example methods described herein. Additionally and/or alternatively, the processor 145 can include one or more logic circuits capable of, for example, implementing operations of the example methods described herein without executing software or instructions. In some examples, the processor 145 and the barcode decoder 140 are implemented by the same device.

The example handheld scanner 100 includes an internal power source 155 configured to power or energize components of the handheld scanner 100 (e.g., the imaging device 120, the barcode decoder 140, the processor 145, and the communication interface 110), an example power source monitor 160 configured to measure an amount of charge or discharge of the internal power source 155, and any type of charging circuit 165 configured to charge the internal power source 155 responsive to power received from an external power source 170. An example internal power source 155 includes a rechargeable lithium ion supercapacitor battery, however, other types of internal power sources can be used. The power source monitor 160 can include any number and/or type(s) of circuits, and/or implement any number and/or type(s) of methods for monitoring the internal power source 155.

In the example shown, the internal power source 155 and, thus, the handheld scanner 100 must be shutdown prior to the internal power source 155 becoming over discharged to prevent damage to the internal power source 155. That is, before the internal power source 155 reaches or falls below a pre-determined amount of charge or discharge, or a pre-determined amount of charge. The internal power source 155 has (i) an active state in which the internal power source 155 provides output power to power or energize components of the handheld scanner 100 (e.g., the imaging device 120, the barcode decoder 140, the processor 145, and the communication interface 110), and (ii) a shutdown state in which the internal power source 155 provides no output power such that the components of the handheld scanner 100 are not energized or powered.

The example processor 145 monitors, based upon one or more outputs of the power source monitor 160, the amount of discharge or the amount of charge of the internal power source 155. Example outputs of the power source monitor 160 include values or signals representing amounts of discharge or charge, or representing whether a current amount of charge or discharge satisfies a criterion (e.g., a logical TRUE or FALSE), such as a pre-determined threshold. When the outputs represent amounts of charge or discharge, the processor 145 can determine whether a current amount of charge or discharge satisfies a criterion (e.g., a logical TRUE or FALSE) by, for example, comparing the outputs to a pre-determined threshold. An example pre-determined threshold represents an amount of charge or discharge of the internal power source 155 that is (slightly) greater than an amount of charge or discharge at which damage to the internal power source 155 may occur, and represents sufficient remaining power for the processor 145 to safely configure the internal power source 155 and, more generally, the handheld scanner 100 into an intentional shutdown state. Thus, the processor 145 can configure the internal power source 155 and, more generally, the handheld scanner 100 into an intentional shutdown state before damage to the internal power source 155 can occur.

The example handheld scanner 100 includes an example non-volatile indicator 175 configurable to provide one or more indications representing that the internal power source 155 and/or, more generally, the handheld scanner 100 is intentionally in a shutdown state, and that the internal power source 155 requires recharging before the handheld scanner 100 can be used again. The non-volatile indicator 175 can provide the one or more indications even while the internal power source 155 and/or, more generally, the handheld scanner 100 is intentionally in a shutdown state. The non-volatile indicator 175 thus indicates to a user of the handheld scanner 100 that the handheld scanner 100 is intentionally shut down because the internal power source 155 is discharged but is otherwise operating as intended. When a current amount of charge or discharge as measured by the power source monitor 160 satisfies a criterion such as a pre-determined threshold, the processor 145 configures the non-volatile indicator 175 to provide the one or more indications representing that the internal power source 155 and/or, more generally, the handheld scanner 100 is intentionally in a shutdown state and that the internal power source 155 requires recharging before the handheld scanner 100 can be used again, before configuring the internal power source 155 and/or, more generally, the handheld scanner 100 into a shutdown state.

When the handheld scanner 100 is coupled to the external power source 170 such that the charging circuit 165 can recharge the internal power source 155 (e.g., when the handheld scanner 100 is positioned in a cradle or dock), and a current amount of charge or discharge of the internal power source 155 satisfies a criterion (e.g., greater than another pre-determined threshold), the internal power source 155 can be automatically configured into the active state by, for example, the charging circuit 165, such that the components of the handheld scanner 100 are energized and the processor 145 can configure the non-volatile indicator 175 to indicate that the internal power source 155 is being charged, fully charged, and/or in the active state, and the handheld scanner 100 can again be used to scan and/or decode barcodes.

An example non-volatile indicator 175 is an E ink display that can be configured to display one or more indications even while the E ink display is not receiving any power because the internal power source 155 and/or, more generally, the handheld scanner 100 is configured into a shutdown state. An example indication display on the E ink display includes a depiction of a depleted or discharged battery.

Another example non-volatile indicator 175 is a mechanical indicator that can be selectively moved by the processor 145 between a first position representing that the internal power source 155 and/or, more generally, the handheld scanner 100 is in an active state, and a second position representing that the internal power source 155 and/or, more generally, the handheld scanner 100 is in a shutdown state. An example mechanical indicator is a selectively positionable sliding member having: a first portion of the mechanical indicator (e.g., having a first color such as green) exposed through an opening in the housing when the mechanical indicator is in the first position; and a second portion of the mechanical indicator (e.g., having a second color such as red) exposed through the opening when the mechanical member is in the second position.

While not shown for clarity of illustration, the handheld scanner 100 can include an optical assembly to form images of an environment in a FOV on a surface of the image sensor 135. The optical assembly can include any number and/or type(s) of optical elements and/or components including, for example, one or more lenses, filters, focus motors, apertures, lens holder, liquid lenses, or any other components and/or optical elements. The optical assembly can also include any number and/or type(s) of focus components (e.g., motors, liquid lenses, etc.) to focus the optical assembly on, for example, a barcode. In some examples, some of the focus components (e.g., an autofocus controller) are implemented by the processor 145. Alternatively, the optical assembly is a fixed-focus optical assembly.

While not shown for clarity of illustration, the handheld scanner 100 can also include an aiming pattern generator configured to provide an illuminated aiming pattern to assist a user in directing the imaging device(s) 120 towards a barcode of interest, and/or an illumination generator to emit light in a FOV to, for example, facilitate autofocus and/or improve the quality of image data captured by the image sensor 135.

Figure 2:
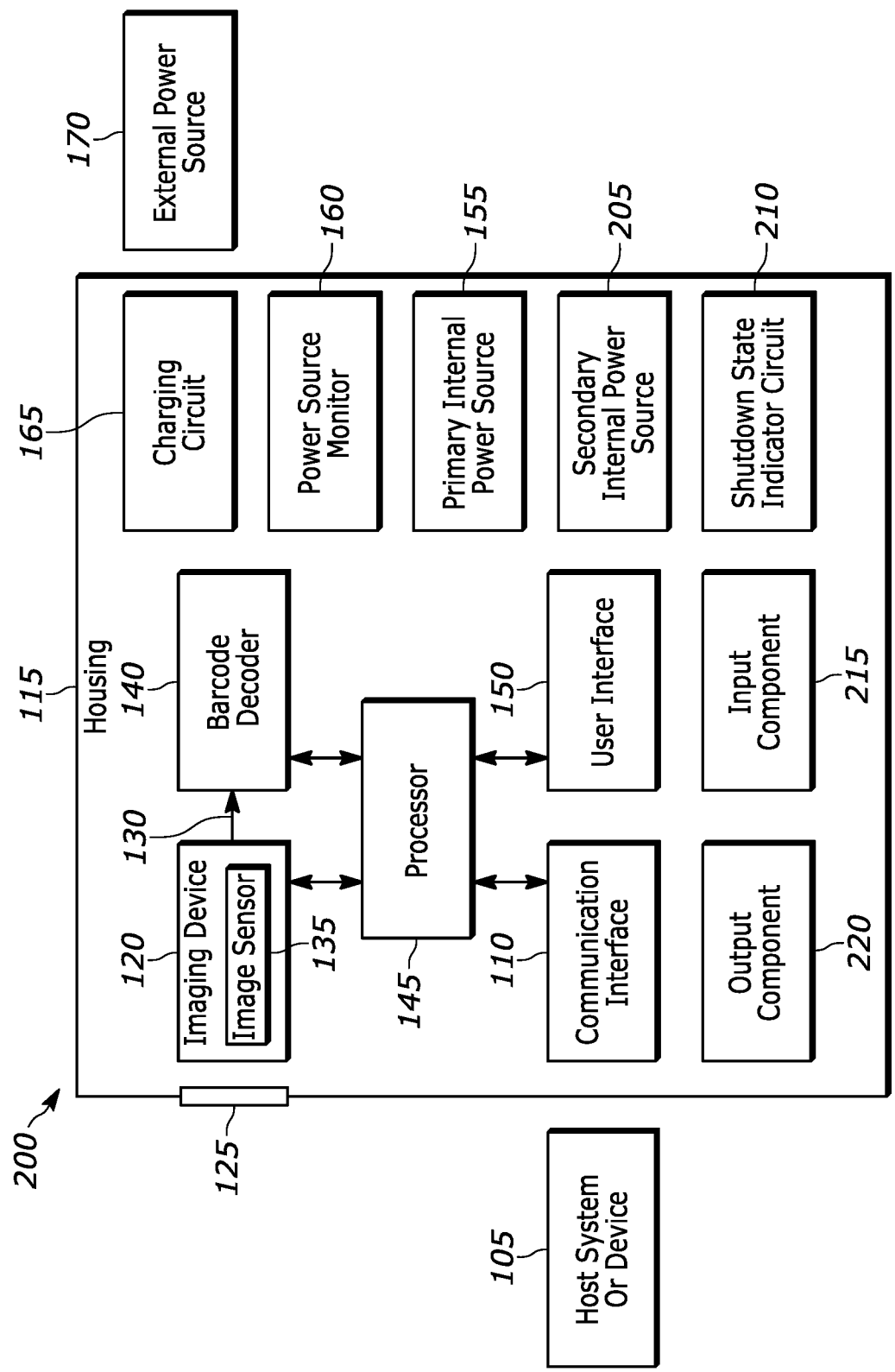
FIG. 2 is a block diagram of another example handheld scanner to provide indications of shutdown states, in accordance with embodiments of the disclosure.

FIG. 2 is a block diagram of another example handheld scanner 200 configured to scan and, in some embodiments, decode scanned barcodes. The handheld scanner 200 can be, for example, a handheld barcode scanner or a handheld slot scanner that can operate in a handheld and/or a handsfree mode. The handheld scanner 200 contains many of the components discussed above in connection with FIG. 1. Like components will be shown with like reference numerals in FIG. 2, and descriptions of like components will not be repeated here. Instead, the interested reader is referred to the description of the like components provided above in connection with FIG. 1. In FIG. 2, the internal power source 155 is shown as a primary internal power source 155 to distinguish it from a secondary internal power source 205 discussed below, but is otherwise the same as the internal power source 155 of FIG. 1.

Like the handheld scanner 100, the example handheld scanner 200 can decode scanned barcodes, and provide the payload of decoded barcodes to a host computing device or system 105 via the communication interface 110. Additionally and/or alternatively, the handheld scanner 100 can provide image data for scanned barcodes to a host computing device or system 105 via the communication interface 110 for decoding.

Instead of the non-volatile indicator 175 of FIG. 1, which is able to provide an indication of a shutdown state while not powered or energized, the example handheld scanner 200 includes a shutdown state indicator circuit 210 that needs to be powered or energized by the secondary internal power source 205 in order to operate and provide a volatile indication that the primary internal power source 155 and/or, more generally, the handheld scanner 200 is intentionally in a shutdown state. In some examples, the shutdown state indicator circuit 210 only operates in response to being trigger by a user input received via an input component 215, such as a trigger 325 (see FIG. 3) when the user attempts to use the handheld scanner 200, and only operates long enough to provide an indication of the shutdown state via an output component 220, such as a light emitting diode (LED), and then powers down. Accordingly, the shutdown state indicator circuit 210 can have a low power consumption and can be powered or energized by a small capacity second internal power source 205 such as a small cell battery. Example secondary internal power sources 205 include a non-rechargeable battery, and a rechargeable battery. Example rechargeable batteries include a lithium cell, a NiMH cell, an electrolytic double layer (EDLC) super capacitors, or the like. In some examples, the shutdown state indicator circuit 210 includes the processor 145, possibly in a low power consumption mode. In some examples, the charging circuit 165 can also charge the secondary internal power source 205 based upon power received from the external power source 170. In some examples, the secondary internal power source 205 is only used to power or energize the shutdown state indicator circuit 210.

For example, the shutdown state indicator circuit 210 can control an LED as the output component 220 that is normally used to provide scanning feedback and/or used to indicate battery condition to indicate that the primary internal power source 155 and/or, more generally, the handheld scanner 200 are intentionally in a shutdown state. For instance, the battery condition indication can be provided a green/yellow/red LED exposed through the housing 115 to indicate charge level, and could, for example, be controlled by the shutdown state indicator circuit 210 to blink red a pre-determined number of times to indicate that the primary internal power source 155 and/or, more generally, the handheld scanner 200 is intentionally in a shutdown state. Alternatively, the shutdown state indicator circuit 210 can control the LED to emit steady red light as long as the input component is triggered.

When the handheld scanner 200 is coupled to the external power source 170 such that the charging circuit 165 can recharge the primary internal power source 155 (e.g., when the handheld scanner 200 is positioned in a cradle or dock), and a current amount of charge of the primary internal power source 155 satisfies a criterion (e.g., greater than another pre-determined threshold), the primary internal power source 155 can be automatically configured into the active state by, for example, the charging circuit 165, such that the components of the handheld scanner 200 are energized and the processor 145 can configure the shutdown state indicator circuit 210 to indicate that the primary internal power source 155 is being charged, fully charged and/or in the active state, and the handheld scanner 200 can again be used to scan and/or decode barcodes.

FIG. 3 is a perspective view of an example handheld scanner housing 300 that can be used to implement the example housing 115 of FIGS. 1 and 2, and/or, more generally, the handheld scanners 100 and 200.

The example housing 300 includes a generally elongated handle or lower handgrip portion 305, and an upper body portion 310 having a front side 315 at which a light-transmissive window or opening 320 is located. The cross-sectional dimensions and overall size of the handgrip portion 305 are such that a handheld scanner based upon the housing 300 can be conveniently held in an operator's hand. The front-facing opening or window 320 is configured to face generally away from a user when the user has a handheld scanner based upon the housing 300 in a handheld position. The portions 305 and 310 can be constructed of a light-weight, resilient, shock-resistant, self-supporting material, such as a synthetic plastic material. The housing 300 can be injection molded, but can also be vacuum-formed or blow-molded to form a thin hollow shell which bounds an interior space whose volume is sufficient to contain the various components of a handheld scanner based upon the housing 300. Although the housing 300 is illustrated as a portable, point-of-transaction, gun-shaped, handheld housing, any other configuration including a hands-free configuration could be used.

A manually actuatable trigger 325 is mounted in a moving relationship on the handgrip portion 305 in a forward facing region 330 of the handgrip portion 305. An operator's finger can be used to actuate (e.g., depress) the trigger 325 once a target falls within an imaging FOV 335 to cause a handheld scanner to capture an image of the target.

To provide one or more non-volatile and/or volatile indications (e.g., by the non-volatile indicator 175, the shutdown state indicator circuit 210, or the output component 220) that an internal power source (e.g., the internal power source 155) and/or, more generally, a handheld scanner (e.g., the handheld scanner 100) is intentionally configured into a shutdown state, the housing 300 includes an opening or window 340 defined therein through which an indication of the shutdown state can be provided. The opening or window 340 can be positioned, as shown in FIG. 3, to face at least one of rearwardly, upwardly, or sidewardly relative to the front-facing window or opening 340, and towards a user such that the opening or window 340 is generally visible to the user while the user has a handheld scanner in the handheld position.

Figure 4:
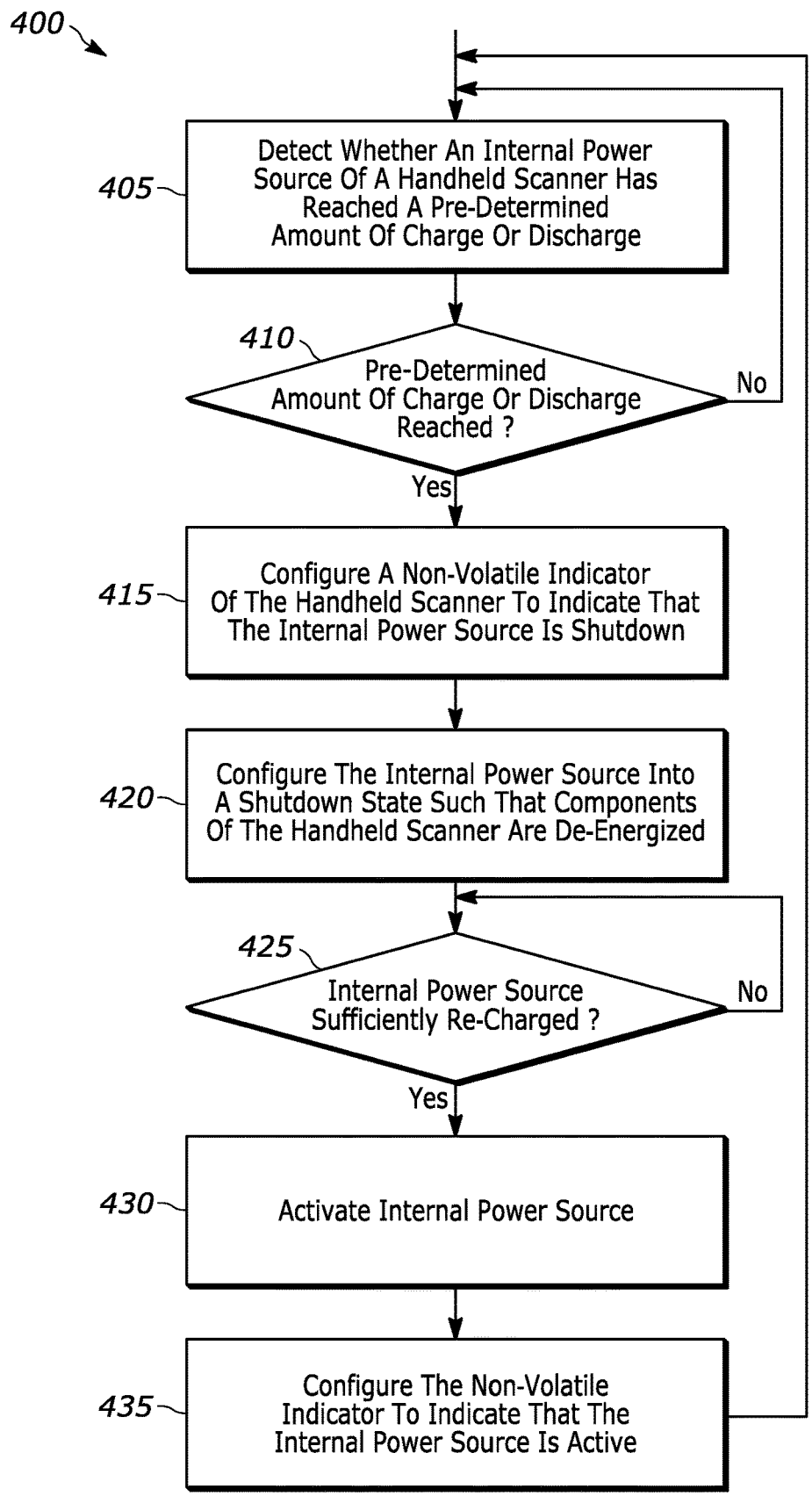
FIG. 4 is a flowchart representative of an example method, hardware logic, machine-readable instructions, or software for providing indications of shutdown states, in accordance with embodiments of the disclosure.

FIG. 4 is a flowchart 400 representative of an example method, hardware logic, machine-readable instructions, or software for providing indications of shutdown states for handheld barcode scanners, as disclosed herein. Any or all of the blocks of FIG. 4 can be an executable program or portion(s) of an executable program embodied in software and/or machine-readable instructions stored on a non-transitory, machine-readable storage medium for execution by one or more processors such as the processor 602 of FIG. 6. Additionally and/or alternatively, any or all of the blocks of FIG. 4 can be implemented by one or more hardware circuits structured to perform the corresponding operation(s) without executing software or instructions.

The example flowchart 400 begins at block 405, with a processor such as the processor 145 determining (e.g., based on one or more outputs of the power source monitor 160) whether an internal power source 155 of a handheld scanner has reached a pre-determined amount of charge or discharge (block 405).

When the pre-determined amount of charge or discharge is reached (block 410), the processor 145 configures a non-volatile indicator 175 to provide one or more indications representing that the internal power source 155 and/or, more generally, the handheld scanner are in a shutdown state (block 415), and configures the internal power source 155 and/or, more generally the handheld scanner into a shutdown state (block 420).

When the internal power source 155 is sufficiently recharged (block 425), the internal power source 155 and/or, more generally, the handheld scanner is configured into an active state (block 430), the processor 145 controls the non-volatile indicator 175 to indicate the internal power source 155 and/or, more generally, the handheld scanner is active (block 435), and control returns to block 405 to monitor the internal power source 155.

Figure 5:
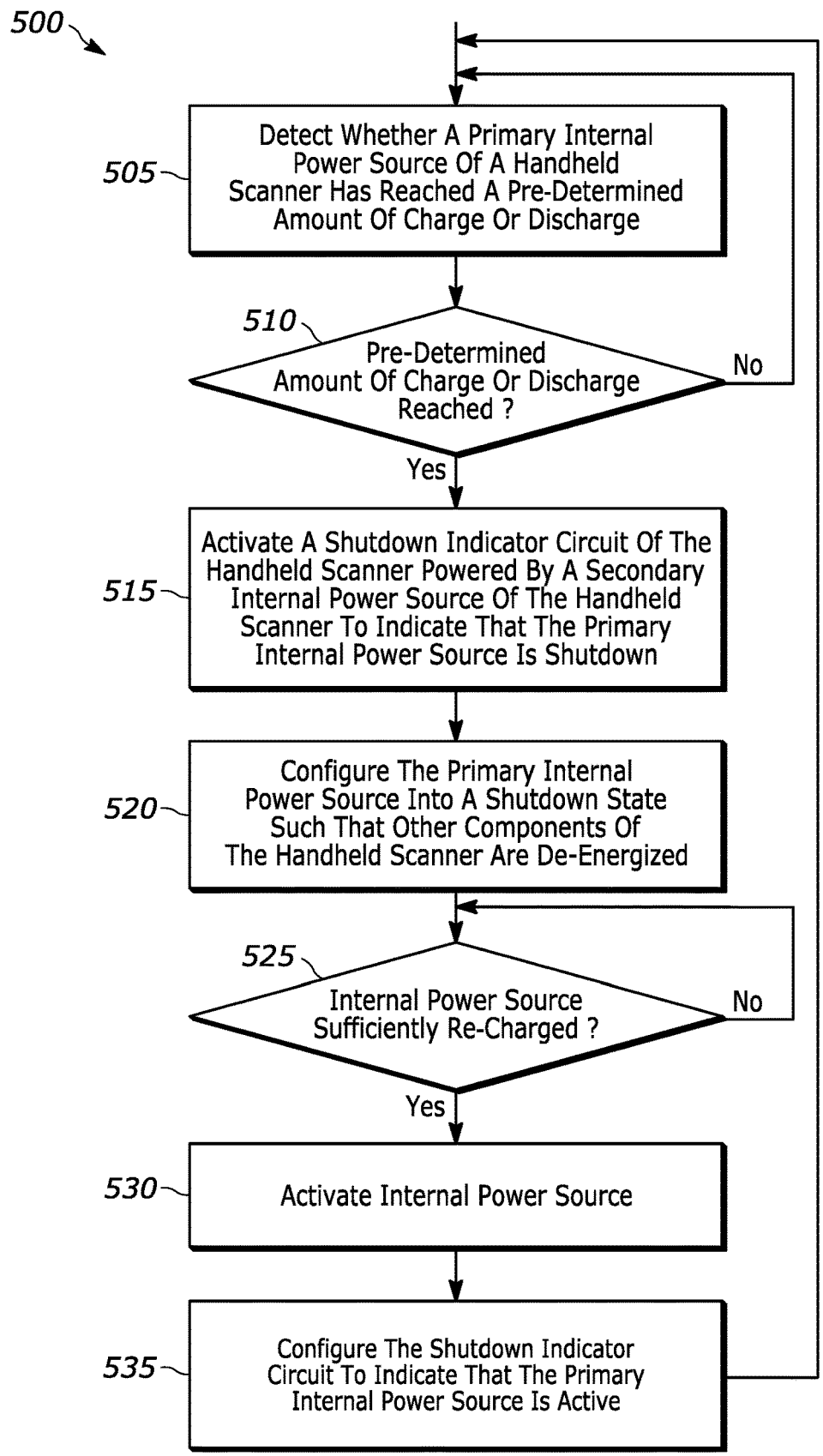
FIG. 5 is a flowchart representative of another example method, hardware logic, machine-readable instructions, or software for providing indications of shutdown states, in accordance with embodiments of the disclosure.

FIG. 5 is a flowchart 500 representative of an example method, hardware logic, machine-readable instructions, or software for providing indications of shutdown states for handheld barcode scanners, as disclosed herein. Any or all of the blocks of FIG. 5 can be an executable program or portion(s) of an executable program embodied in software and/or machine-readable instructions stored on a non-transitory, machine-readable storage medium for execution by one or more processors such as the processor 602 of FIG. 6. Additionally and/or alternatively, any or all of the blocks of FIG. 5 can be implemented by one or more hardware circuits structured to perform the corresponding operation(s) without executing software or instructions.

The example flowchart 500 begins at block 505, with a processor such as the processor 145 determining (e.g., based on one or more outputs of the power source monitor 160) whether a primary internal power source 155 of a handheld scanner has reached a pre-determined amount of charge or discharge (block 505).

When the pre-determined amount of charge or discharge is reached (block 510), the processor 145 configures a shutdown state indicator circuit 210 to provide one or more indications representing that the primary internal power source 155 and/or, more generally, the handheld scanner is in a shutdown state (block 515), and configures the primary internal power source 155 and/or, more generally the handheld scanner into a shutdown state (block 520).

When the primary internal power source 155 is sufficiently recharged (block 525), the primary internal power source 155 and/or, more generally, the handheld scanner is configured into an active state (block 530), the processor 145 controls or de-activates the shutdown state indicator circuit 210 to indicate the primary internal power source 155 and/or, more generally, the handheld scanner is active (block 535), and control returns to block 505 to monitor the primary internal power source 155.

Figure 6:
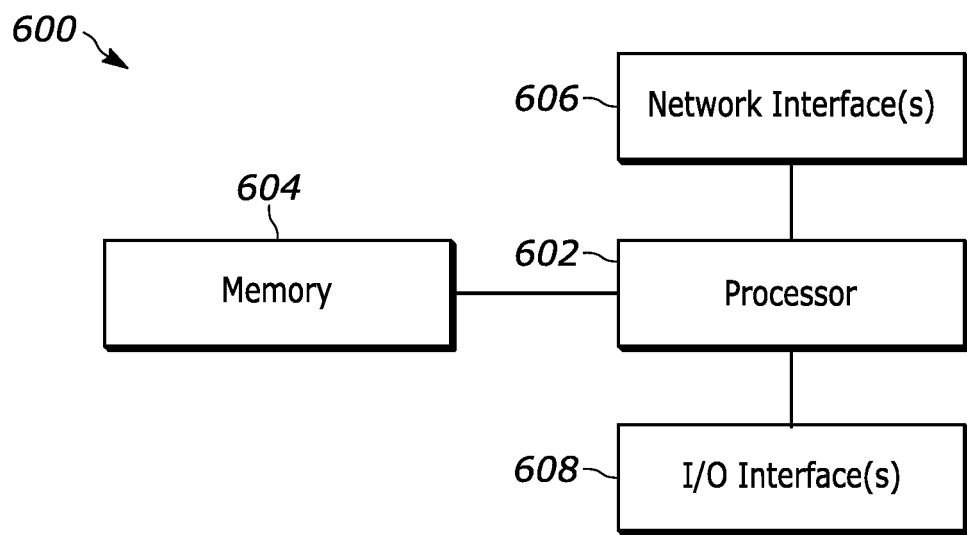
FIG. 6 is a block diagram of an example logic circuit for implementing the example handheld scanners of FIGS. 1 and 2, and/or the example methods and/or operations described herein.

FIG. 6 is a block diagram representative of an example logic circuit capable of implementing, for example, one or more components of the example handheld scanners 100, 200 of FIGS. 1 and 2, or, more generally, the example processor 145. The example logic circuit of FIG. 6 is a processing platform 600 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 600 of FIG. 6 includes a processor 602 such as, for example, one or more microprocessors, controllers, and/or any suitable type of processor. The example processing platform 600 of FIG. 6 includes memory (e.g., volatile memory, non-volatile memory) 604 accessible by the processor 602 (e.g., via a memory controller). The example processor 602 interacts with the memory 604 to obtain, for example, machine-readable instructions stored in the memory 604 corresponding to, for example, the operations represented by the flowcharts of this disclosure. Additionally or alternatively, machine-readable instructions corresponding to the example operations described herein can be stored on one or more removable media (e.g., a compact disc, a digital versatile disc, removable flash memory, etc.) that can be coupled to the processing platform 600 to provide access to the machine-readable instructions stored thereon.

The example processing platform 600 of FIG. 6 includes one or more communication interfaces such as, for example, one or more network interface 606, and/or one or more input/output (I/O) interfaces 608. The communication interface(s) enable the processing platform 600 of FIG. 6 to communicate with, for example, another device, system, host system (e.g., the host computing device or system 105, an inventory management system, a POS station, etc.), datastore, database, and/or any other machine. The communication interface(s) can be used to implement the communication interface 110 of FIGS. 1 and 2, for example.

The example processing platform 600 of FIG. 6 includes the network interface(s) 606 to enable communication with other machines (e.g., the host computing system 112, an inventory management system, a POS station, etc.) via, for example, one or more networks. The example network interface 606 includes any suitable type of communication interface(s) (e.g., wired and/or wireless interfaces) configured to operate in accordance with any suitable communication protocol(s). Example network interfaces 606 include a TCP/IP interface, a WiFi™ transceiver (e.g., according to the IEEE 802.11x family of standards), an Ethernet transceiver, a cellular network radio, a satellite network radio, or any other suitable interface based on any other suitable communication protocols or standards.

The example, processing platform 600 of FIG. 6 includes the input/output (I/O) interface(s) 608 (e.g., a Bluetooth® interface, a near-field communication (NFC) interface, a universal serial bus (USB) interface, a serial interface, an infrared interface, etc.) to enable receipt of user input (e.g., from the input component 215, the trigger 325, a touch screen, keyboard, mouse, touch pad, joystick, trackball, microphone, button, etc.) and communication of output data (e.g., visual indicators, instructions, data, images, etc.) to the user (e.g., via the output component 220, an LED, a display, speaker, printer, etc.).

The above description refers to a block diagram of the accompanying drawings. Alternative implementations of the example represented by the block diagram includes one or more additional or alternative elements, processes, and/or devices. Additionally or alternatively, one or more of the example blocks of the diagram can be combined, divided, re-arranged, or omitted. Components represented by the blocks of the diagram are implemented by hardware, software, firmware, and/or any combination of hardware, software, and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAS, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged, or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A handheld device, comprising:
    a housing having;
    an internal power source disposed inside the housing, and having an active state in which output power is provided, and a shutdown state in which no output power is provided;
    a power source monitor configured to detect whether the internal power source has reached a pre-determined amount of discharge at which the internal power source is to be shut down to prevent damage to the internal power source;
    an indicator; and
    a processor configured to:
        be energized by the internal power source when the internal power source is in the active state,
        detect, based upon one or more outputs of the power source monitor, whether the internal power source has reached the pre-determined amount of discharge, and
        when the internal power source has reached the pre-determined amount of discharge:
            configure the indicator to provide, while the internal power source is in the shutdown state, an indication that the internal power source is shutdown, and
            configure the internal power source into the shutdown state such that the processor is de-energized.

2. The handheld device of claim 1, wherein, when the internal power source is charged to above the pre-determined amount of discharge, the processor is re-energized, configures the internal power source to the active state, and configures the indicator to indicate that the internal power source is in the active state.

3. The handheld device of claim 1, wherein the indicator includes an E ink display, wherein the processor is configured to control the E ink display to display one or more non-volatile indications representative of the internal power source being in the shutdown state, and wherein the E ink display continues displaying the one or more indications while the internal power source is in the shutdown state.

4. The handheld device of claim 3, wherein a first indication of the one or more indications depicts a discharged battery.

5. The handheld device of claim 1, wherein the indicator includes a mechanical indicator, and wherein the processor is configured to control the mechanical indicator from a first position to a second position to indicate that the internal power source is in the shutdown state.

6. The handheld device of claim 5, wherein the mechanical indicator includes a selectively positionable sliding member.

7. The handheld device of claim 5, wherein a portion of the mechanical indicator is exposed through a second opening in the housing, wherein the mechanical indicator in the first position exposes a first portion of the mechanical indicator having a first color through the second opening, and where the mechanical indicator in the second position exposes a second portion of the mechanical indicator having a second different color through the second opening.

8. The handheld device of claim 1, wherein the internal power source is a primary internal power source, wherein the handheld device further comprises a secondary internal power source, wherein the indicator includes a shutdown state indicator circuit powered or energized by the secondary internal power source, and wherein the processor configures the indicator by activating the shutdown state indicator circuit.

9. The handheld device of claim 8, wherein the secondary internal power source is not configured to power the processor.

10. The handheld device of claim 8, wherein the shutdown state indicator circuit includes:
    an input component configured to sense an attempted use of the handheld device; and
    an output component configured to provide the indication, wherein the input component and the output component are energized by the secondary internal power source.

11. The handheld device of claim 10, wherein the input component is configured to sense an activation of a trigger of the handheld device, and the output component includes a light emitting component that is blinked to provide the indication.

12. The handheld device of claim 10, wherein the shutdown state indicator circuit further includes the processor, wherein the processor is energized by the secondary internal power source in response to the attempted use of the handheld device, and controls the output component to provide the indication, and shuts down.

13. The handheld device of claim 8, further comprising a charging circuit configured to charge the secondary internal power source based on the power received from an external power source.

14. The handheld device of claim 1, further comprising a charging circuit to:
    receive power from an external power source;
    charge the internal power source based on the power received from the external power source;
    detect whether the internal power source is charged above the pre-determined amount of discharge; and
    when the internal power source is charged above the pre-determined amount of discharge, configure the internal power source into the active state to re-energize the processor.

15. The handheld device of claim 14, wherein the processor is configured to, responsive to the internal power source being configured into the active state, configure the indicator to indicate that the internal power source is in the active state.

16. The handheld device of claim 15, wherein, the processor is configured to, while the internal power source is being charged, configure the indicator to indicate that the internal power source is being charged.

17. The handheld device of claim 15, wherein, the processor is configured to, when the internal power source is fully charged, configure the indicator to indicate that the internal power source is fully charged.

18. A method, comprising:
    detecting whether an internal power source of a handheld device has reached a pre-determined amount of charge at which the internal power source is to be shut down to prevent damage to the internal power source, the internal power source having an active state in which output power is provided to components of the handheld device, and a shutdown state in which no output power is provided; and
    when the internal power source has reached the pre-determined amount of charge:
        configuring an indicator of the handheld device to indicate that the internal power source is in the shutdown state, wherein the indicator can indicate the shutdown state while the internal power source is in the shutdown state, and configuring the internal power source into the shutdown state such that the components of the handheld device are de-energized.

19. The method of claim 18, wherein configuring the indicator includes configuring an E ink display to display one or more indications representative of the internal power source being in the shutdown state, and wherein the E ink display continues displaying the one or more indications while the internal power source is in the shutdown state.

20. The method of claim 18, wherein configuring the indicator includes controlling a mechanical indicator from a first position to a second position to indicate that the internal power source is in the shutdown state.

21. The method of claim 18, wherein the internal power source is a primary internal power source, and wherein configuring the indicator includes configuring a shutdown state indicator circuit powered or energized by a secondary internal power source to provide the indication.

22. The method of claim 21, wherein configuring the shutdown state indicator circuit includes activating the shutdown state indicator circuit to respond to an attempted use of the handheld device, and to provide the indication via an output component, wherein the input component and the output component are energized by the secondary internal power source.

23. The method of claim 22, wherein the attempted use is an activation of a trigger of the handheld device, and the output component is a light emitting component that is blinked to provide the indication.

24. A non-transitory, computer-readable storage medium storing instructions that, when executed by one or more processors, cause a handheld device to:

detect whether an internal power source of a handheld device has reached a pre-determined amount of charge at which the internal power source is to be shut down to prevent damage to the internal power source, the internal power source having an active state in which output power is provided to components of the handheld device, and a shutdown state in which no output power is provided; and when the internal power source has reached the pre-determined amount of charge:

configure an indicator of the handheld device to indicate that the internal power source is in the shutdown state, wherein the indicator can indicate the shutdown state while the internal power source is in the shutdown state, and configure the internal power source into the shutdown state such that the components of the handheld device are de-energized.

25. The storage medium of claim 24, wherein the instructions, when executed by one or more processors, cause the handheld device to configure the indicator by configuring an E ink display to display one or more indications representative of the internal power source being in the shutdown state, and wherein the E ink display continues displaying the one or more indications while the internal power source is in the shutdown state.

26. The storage medium of claim 24, wherein the instructions, when executed by one or more processors, cause the handheld device to configure the indicator by controlling a mechanical indicator from a first position to a second position to indicate that the internal power source is in the shutdown state.

27. The storage medium of claim 24, wherein the internal power source is a primary internal power source, and the instructions, when executed by one or more processors, cause the handheld device to configure the indicator by activating a shutdown state indicator circuit that is powered or energized by a secondary internal power source, and provides the indication responsive to an attempted use the handheld device.

* * * * *